(12) United States Patent
Kim et al.

(10) Patent No.: US 10,025,021 B2
(45) Date of Patent: Jul. 17, 2018

(54) DISPLAY DEVICE AND METHOD OF FABRICATING THE SAME

(71) Applicants: Samsung Display Co., Ltd., Yongin-si, Gyeonggi-Do (KR); SHINWHA INTERTEK CORP, Cheonan-si, Chungcheongnam-do (KR)

(72) Inventors: Donghoon Kim, Suwon-si (KR); Myeong-Ju Shin, Seoul (KR); Juyoung Yoon, Seoul (KR); Seunghwan Chung, Asan-si (KR); Youngjun Choi, Yongin-si (KR); Mi-sun Park, Chungcheongnam-do (KR); Hyun-Min Bae, Cheonan-si (KR); Jae-suk Ahn, Seoul (KR); Il-ho Jeon, Sejong (KR)

(73) Assignees: Samsung Display Co., Ltd., Yongin-si (KR); SHINWHA INTERTEK CORP, Cheonan-si (KR)

( * ) Notice: Subject to any disclaimer, the term of this patent is extended or adjusted under 35 U.S.C. 154(b) by 261 days.

(21) Appl. No.: 14/794,289

(22) Filed: Jul. 8, 2015

(65) Prior Publication Data

US 2016/0077273 A1 Mar. 17, 2016

(30) Foreign Application Priority Data

Sep. 12, 2014 (KR) ........................ 10-2014-0121127

(51) Int. Cl.
 *F21V 8/00* (2006.01)
(52) U.S. Cl.
 CPC ......... *G02B 6/0053* (2013.01); *G02B 6/0051* (2013.01); *G02B 6/0031* (2013.01);
 (Continued)

(58) Field of Classification Search
 CPC .. G02B 6/0026; G02B 6/0053; G02B 6/0051; G02B 6/0031; G02F 2001/133614
 (Continued)

(56) References Cited

U.S. PATENT DOCUMENTS

| RE37,377 E | * | 9/2001 | Gunjima | ................... F21V 9/14 |
| | | | | 349/113 |
| 9,513,426 B2 | * | 12/2016 | Hong | ................... G02B 6/0053 |

(Continued)

FOREIGN PATENT DOCUMENTS

| JP | 10-228103 A | 8/1998 |
| KR | 10-0544005 B1 | 10/1999 |

(Continued)

*Primary Examiner* — Karabi Guharay
(74) *Attorney, Agent, or Firm* — H.C. Park & Associates, PLC

(57) ABSTRACT

Provided are a display device and a method of fabricating the display device. The display device includes a display panel, a backlight unit, and a light emitting sheet. The backlight unit is disposed under the display panel to provide light to the display panel. The light emitting sheet is disposed between the display panel and the backlight unit. The light emitting sheet includes a lower film, a first light emitting resin pattern layer, an upper film, and a second light emitting resin pattern layer. The first light emitting resin pattern layer is disposed on the lower film and includes a plurality of first protrusions and a plurality of first grooves defined between the first protrusions. The upper film is disposed on the first light emitting resin pattern layer. The second light emitting resin pattern layer is disposed between the first light emitting resin pattern layer and the upper film.

10 Claims, 8 Drawing Sheets

(52) U.S. Cl.
  CPC .......... *G02B 6/0065* (2013.01); *G02B 6/0068* (2013.01); *Y10S 977/774* (2013.01)

(58) Field of Classification Search
  USPC .......................................................... 362/84
  See application file for complete search history.

(56) References Cited

U.S. PATENT DOCUMENTS

| | | |
|---|---|---|
| 2012/0113672 A1 | 5/2012 | Dubrow et al. |
| 2013/0075692 A1 | 3/2013 | Naasani et al. |

FOREIGN PATENT DOCUMENTS

| | | |
|---|---|---|
| KR | 10-2010-0013453 A | 2/2010 |
| KR | 10-2012-0061538 A | 6/2012 |
| KR | 10-2014-0030404 A | 3/2014 |

\* cited by examiner

DISPLAY DEVICE AND METHOD OF FABRICATING THE SAME

CLAIM OF PRIORITY

This application makes reference to, incorporates the same herein, and claims all benefits accruing under 35 U.S.C. § 119 from an application earlier filed in the Korean Intellectual Property Office on 12 Sep. 2014 and there duly assigned Serial No. 10-2014-0121127.

BACKGROUND OF THE INVENTION

Field of the Invention

The present disclosure relates to a display device and a method of fabricating the same, and more particularly, to a display device including a light emitting sheet and a method of fabricating the same.

Description of the Related Art

Display devices may be classified into liquid crystal display devices, electrowetting display devices, and eletrophoretic display devices. Such a display device includes a non-emissive type display panel and a separate backlight unit for providing light to the display panel. In general, the backlight unit may provide white light to the display panel. The white light may be converted into light having a special color and thus may be seen by user's eye.

In recent years, in order to improve visibility and color reproducibility of the display devices, light emitting sheets including light emitting particles are being used. In general, when such a light emitting sheet is formed by using a light emitting resin solution having high viscosity, light emitting particles may be aggregated while being cured and also may not be uniformly dispersed into the light emitting sheet. Thus, the display device including the light emitting sheet that is formed by using the light emitting resin solution having the high viscosity may be deteriorated in color reproducibility.

If the light emitting sheet is formed by using a light emitting resin solution having viscosity of about 1,000 cP or less, light emitting particles may not be aggregated, but be uniformly dispersed into the light emitting sheet. However, it is difficult to control the light emitting resin solution having the low viscosity during the process. Also, when the light emitting sheet is formed by using the light emitting resin solution having the low viscosity, the light emitting sheet may have a sufficient thickness that is capable of improving color reproducibility. However, it may be difficult to fabricate a light emitting sheet having a uniform thickness.

It is to be understood that this background of the invention section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

The present disclosure provides a display device including a light emitting sheet having a uniform thickness that is capable of realizing superior color reproducibility by using a resin having low viscosity.

The present disclosure also provides a method of fabricating a display device including a light emitting sheet having a uniform thickness that is capable of realizing superior color reproducibility by using a resin having low viscosity.

Embodiments of the inventive concept provide display devices including a display panel, a backlight unit, and a light emitting sheet. The display panel displays an image. The backlight unit is disposed under the display panel to provide light to the display panel. The light emitting sheet is disposed between the display panel and the backlight unit. The light emitting sheet includes a lower film, a first light emitting resin pattern layer, an upper film, and a second light emitting resin pattern layer. The first light emitting resin pattern layer is disposed on the lower film and includes a plurality of first protrusions and a plurality of first grooves defined between the first protrusions. The upper film is disposed on the first light emitting resin pattern layer. The second light emitting resin pattern layer is disposed between the first light emitting resin pattern layer and the upper film.

In some embodiments, the second light emitting resin pattern layer may include a plurality of second protrusions and a plurality of second grooves defined between the plurality of second protrusions. The second protrusions may respectively contact the first grooves and the first protrusions may respectively contact the second grooves.

In other embodiments, each of the first protrusions may have at least one of a triangular shape, a quadrangular shape, a partial circular shape, and a partial oval shape.

In still other embodiments, the first light emitting resin pattern layer may have a thickness of about 20 µm to about 40 µm.

In even other embodiments, the second light emitting resin pattern layer may have a thickness greater than or equal to that of the first light emitting resin pattern layer.

In yet other embodiments, the first light emitting resin pattern layer may include a first light emitting particle, the second light emitting resin pattern layer may include a second light emitting particle, and each of the first and second light emitting particles may include a phosphor or quantum dot.

In further embodiments, the quantum dot may be formed of at least one of Group II-VI compounds, Group II-V compounds, Group III-VI compounds, Group III-V compounds, Group IV-VI compounds, Group I-III-VI compounds, Group II-IV-VI compounds, and Group II-IV-V compounds.

In still further embodiments, the quantum dot may include a core and a shell overcoating the core. The core may be formed of at least one of CdS, CdSe, CdTe, ZnS, ZnSe, ZnTe, GaN, GaP, GaAs, GaSb, AN, AlP, AlAs, AlSb, InP, InAs, InSb, SiC, Ca, Se, In, P, Fe, Pt, Ni, Co, Al, Ag, Au, Cu, FePt, Fe2O3, Fe3O4, Si, and Ge, and the shell may be formed of at least one of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TIN, TIP, TIAs, TISb, PbS, PbSe, and PbTe.

In even further embodiments, at least one of the first light emitting resin pattern layer and the second light emitting resin pattern layer may be provided in plurality.

In other embodiments of the inventive concept, methods of fabricating a display device include: forming a light emitting sheet; disposing the light emitting sheet on a backlight unit; and disposing a display panel of the light emitting sheet. The formation of the light emitting sheet includes: forming a first light emitting resin pattern layer including a plurality of first protrusions and a plurality of first grooves formed between the first protrusions on a lower film; and forming a second light emitting resin pattern layer including a plurality of second protrusions contacting the first grooves and a plurality of second grooves formed between the second protrusions to contact the first protrusions.

In some embodiments, the formation of the first light emitting resin pattern layer may include: providing a first light emitting resin solution onto the lower film; forming a first light emitting resin pattern on the lower film; and curing the first light emitting resin pattern to form the first light emitting resin pattern layer.

In other embodiments, the formation of the first light emitting resin pattern may include: disposing a patterning mold on the lower film; and rolling the lower film and the patterning mold to form the first light emitting resin pattern.

In still other embodiments, the formation of the second light emitting resin pattern layer may include: disposing an upper film on the lower film on which the first light emitting resin pattern layer is formed; providing a second light emitting resin solution between the first light emitting resin pattern layer and the upper film; forming a second light emitting resin pattern between the first light emitting resin pattern layer and the upper film; and curing the second light emitting resin pattern to form the second light emitting resin pattern layer.

In even other embodiments, the formation of the second light emitting resin pattern may include rolling the lower film and the upper film to form the second light emitting resin pattern.

In yet other embodiments, each of the first light emitting resin solution and the second light emitting resin solution may have viscosity of about 1 cP to about 1,000 cP.

In further embodiments, the first light emitting resin pattern layer may have a thickness of about 20 μm to about 40 μm.

In still further embodiments, the formation of the second light emitting resin pattern layer may include forming the second light emitting resin pattern layer so that the second light emitting resin pattern layer has a thickness greater than or equal to that of the first light emitting resin pattern layer.

In even further embodiments, each of the first protrusions may have at least one of a triangular shape, a quadrangular shape, a partial circular shape, and a partial oval shape.

In yet further embodiments, the first light emitting resin pattern layer may include a first light emitting particle, the second light emitting resin pattern layer may include a second light emitting particle, and each of the first and second light emitting particles may include a phosphor or quantum dot.

In much further embodiments, the formation of the first light emitting resin pattern layer and the formation of the second light emitting resin pattern layer may be performed several times.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
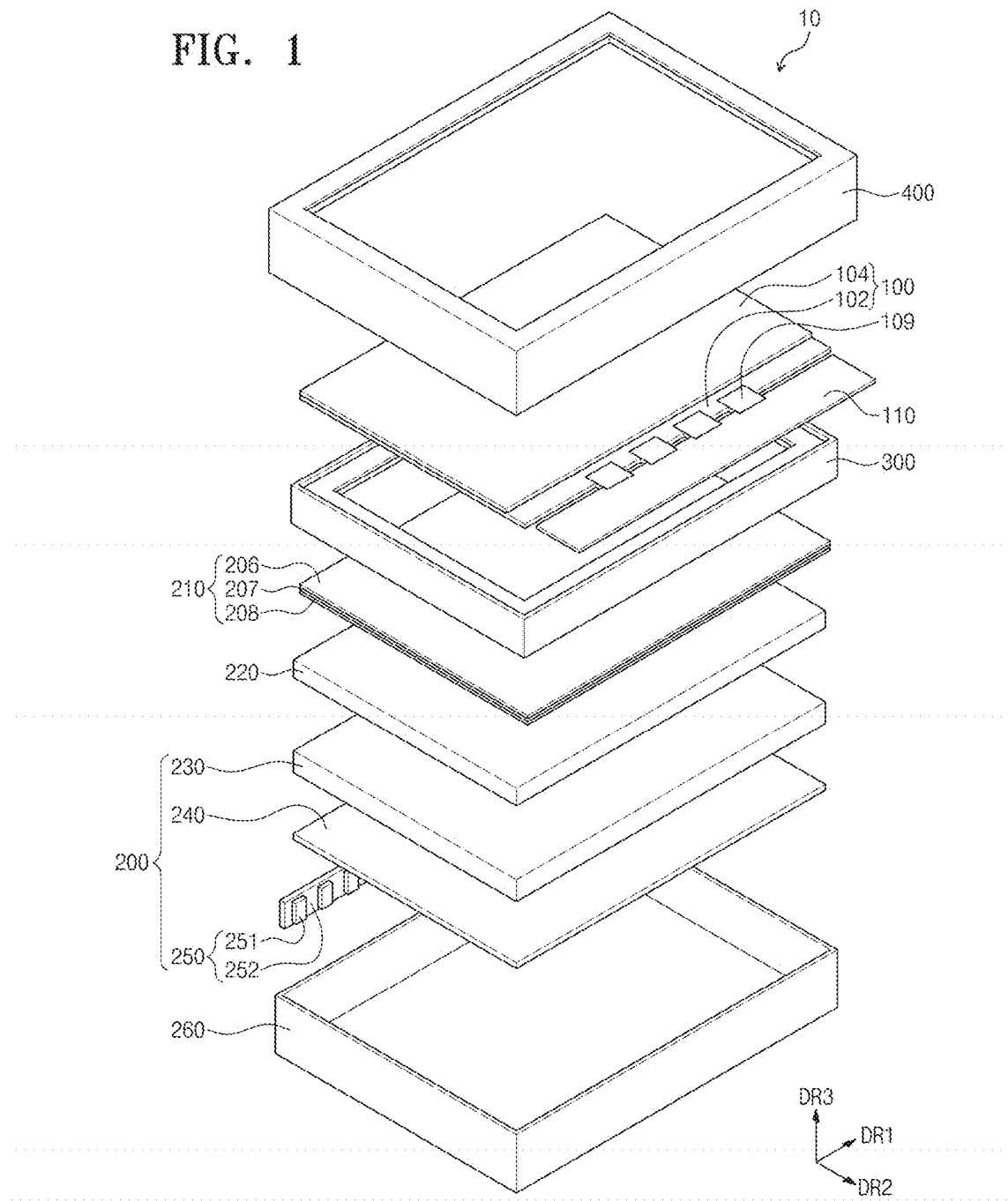
FIG. 1 is a schematic exploded perspective view of a display device according to an embodiment of the inventive concept.

The objects, other objectives, features, and advantages of the inventive concept will be understood without difficulties through preferred embodiments below related to the accompanying drawings. The present disclosure may, however, be embodied in different forms and should not be construed as limited to the embodiments set forth herein. Rather, these embodiments are provided so that this disclosure will be thorough and complete, and will fully convey the scope of the inventive concept to those skilled in the art.

Like reference numerals refer to like elements throughout. In the drawings, the dimensions and size of each structure are exaggerated, omitted, or schematically illustrated for convenience in description and clarity. It will be understood that although the terms of first and second are used herein to describe various elements, these elements should not be limited by these terms. The terms are only used to distinguish one component from other components. For example, a first element referred to as a first element in one embodiment can be referred to as a second element in another embodiment. The terms of a singular form may include plural forms unless referred to the contrary.

The meaning of 'include' or 'comprise' specifies a property, a region, a fixed number, a step, a process, an element and/or a component but does not exclude other properties, regions, fixed numbers, steps, processes, elements and/or components. In the specification, it will be understood that when a layer (or film), a region, or a plate is referred to as being 'on' another layer, region, or plate, it can be directly on the other layer, region, or plate, or intervening layers, regions, or plates may also be present. On the contrary to this, it will be understood that when a layer (or film), a region, or a plate is referred to as being 'under' another layer, region, or plate, it can be directly under the other layer (or film), region, or plate, or intervening layers, regions, or plates may also be present.

FIG. 1 is a schematic exploded perspective view of a display device according to an embodiment of the inventive concept.

In reference to FIG. 1, a display device 10 includes a display panel 100, a backlight unit 200, and a light emitting sheet 220. The display device 10 may further include a bottom chassis 260, a mold frame 300, and a top chassis 400.

A long axis direction of the display device 10 may be defined as a first direction (for example, a DR1 direction in FIG. 1), and a short axis direction of the display device 10 may be defined as a second direction (for example, a DR2 direction in FIG. 1) that is perpendicular to the first direction (DR1). The bottom chassis 260, the backlight unit 200, a mold frame 300, the display panel 100, and the top chassis 400 are successively stacked in a third direction (for example, a DR3 direction in FIG. 1) that is perpendicular to each of the first direction (DR1) and the second direction (DR2).

The display panel 100 displays an image. The display panel 100 may be a non-emissive display panel. The display panel 100 may include various display panels such as a liquid crystal display panel, a plasma display panel, an electrophoretic display panel, a microelectromechanical system (MEMS) display panel, and an electrowetting display panel. The liquid crystal display panel will be described as an example of the display panel according to an embodiment of the inventive concept.

The liquid crystal display panel may be one panel of a vertical alignment (AV) mode panel, a patterned vertical alignment (PVA) mode panel, an in-plane switching (IPS) mode panel, a fringe-field switching (FFS) mode panel, and a plane to line switching (PLS) mode panel. The liquid crystal display panel is not limited to a specific mode panel.

The display panel 100 may include a first substrate 102 and a second substrate 104 disposed on the first substrate 102. The display panel 100 will be described below in detail.

The display device 10 may further include a printed circuit board (PCB) 110 and a tape carrier package 109.

The PCB 110 is electrically connected to the display panel 100. The PCB 110 may provide a driving signal to the display panel 100. The PCB 110 may include a driving unit (not shown). Although the PCB 110 includes the driving unit (not shown) in an embodiment of the inventive concept, the tape carrier package 109 or the first substrate 102 may include the driving unit (not shown).

The driving unit (not shown) may generate the driving signal for driving the display panel 100 in response to an external signal. The external signal may be a signal provided from the PCB 110. For example, the external signal may include an image signal, various control signals, a driving voltage, and the like. The driving signal may include a gate signal applied into a gate line and a data signal applied into a data line.

The driving unit (not shown) may include a data driver (not shown) that converts an image signal into a data signal to transmit the converted data signal into the display panel and a gate driver (not shown) that converts an image signal into a gate signal to transmit the converted gate signal into the display panel 100. However, the present disclosure is not limited thereto. For example, each of the data driver (not shown) and the gate driver (not shown) may be provided as a chip and then be included in the tape carrier package 109. Alternatively, each of the data driver (not shown) and the gate driver (not shown) may be mounted on the first substrate 102 in a chip on glass (COG) form.

The tape carrier package 109 is electrically connected to the PCB 110 and the display panel 100. The tape carrier package 109 may be provided in plurality. The tape carrier package 109 may be bent to surround a side surface of the bottom chassis 260.

The backlight unit 200 may include a light source unit 250 and a light guide plate 230. The backlight unit 200 may be disposed under the display panel 100 to provide light to the display panel 100.

The light source unit 250 provides light to the light guide plate 230. The light source unit 250 may include at least one light source 251 and a circuit board 252 applying a power into the light source 251 that is mounted on one surface thereof. The light source 251 may be a light emitting diode (LED). The circuit board 252 may have a plate shape. The light source 251 may be provided in plurality. The plurality of light sources 251 may be disposed on the circuit board 252 and spaced apart from each other in the first direction (DR1).

The light guide plate 230 guides the light emitted from the light source unit 250 to emit the light. The light guide plate 230 may have a rectangular parallelepiped plate shape and be disposed under the display panel 100. The light guide plate 230 may be formed of a transparent polymer resin such as polycarbonate or polymethyl methacrylate. The light guide plate 230 guides the light emitted from the light source unit 250 to emit the light to the display panel 100. The light incident into the light guide plate 230 may be emitted to the display panel 100 through a top surface of the light guide plate 230.

Although the light source unit 250 is provided to correspond to only one of side surfaces of the light guide plates 230 in the display device 10 according to an embodiment of the inventive concept, the present disclosure is not limited thereto. For example, a plurality of light source units 250 may be disposed along other side surfaces of the light guide plate 230. Also, although the display device 10 according to an embodiment of the inventive concept includes an edge-type light source unit 250, the present disclosure is not limited thereto. For example, the display device 10 according to an embodiment of the inventive concept may include a direct-type light source unit 250. Generally, in an edge-type light source unit, a light source is arranged at either lateral side of the display panel and a light guide plate is arranged in rear of the display panel, so that light incident from the lateral side of the display panel is guided to the rear side of the display panel. Generally, in a direct-type light source unit, a plurality of light sources are provided on a rear surface of the display panel, and light emitted from the light sources is directly supplied to the rear surface of the display panel.

The backlight unit 200 may further include a reflective sheet 240. The reflective sheet 240 may be disposed under the light guide plate 230. The reflective sheet 240 may reflect light that leaks without traveling toward the display panel 100 to change a path of the light so that the reflected light travels toward the display panel 100. Thus, the reflective sheet 240 increases an amount of light provided to the display panel 100.

As described above, the display device 100 according to an embodiment of the inventive concept includes the light emitting sheet 220. The light emitting sheet 220 is disposed between the display panel 100 and the backlight unit 200. The light emitting sheet 220 will be described below in detail.

An optical member 210 maybe disposed between the backlight unit 200 and the light emitting sheet 220.

The optical member 210 may be disposed between the display panel 100 and the light guide plate 230. The optical member 210 may improve brightness and viewing angle of light emitted from a light emission surface of the light guide plate 230. The optical member 210 may include a first optical sheet 208, a second optical sheet 207, and a third optical sheet 206, which are successively stacked.

The first optical sheet 208 may be a diffusion sheet for diffusing the light emitted from the light guide plate 230. The second optical sheet 207 may be a prism sheet that collects the light diffused by the diffusion sheet in a direction that is perpendicular to a plane of the display panel 100 disposed above the second optical sheet 207. The third optical sheet may be a protective sheet for protecting the prism sheet against an external impact. A plurality of sheets of at least one of the first optical sheet 208, the second optical sheet 207, and the third optical sheet 206 may overlap each other to form the optical member 210. If necessary, at least one sheet may be omitted.

The bottom chassis 260 may be disposed under the backlight unit 200. The bottom chassis 260 may accommodate components of the backlight unit 200. The bottom chassis 260 and the top chassis 400 may be coupled to each other to face each other.

The mold frame 300 is disposed between the display panel 100 and the backlight unit 200. The mold frame 300 is disposed along an edge of the display panel 100 to support the display panel 100 from a lower side of the display panel 100. The mold frame 300 has an approximately tetragonal ring shape.

The top chassis 400 is disposed on the display panel 100. The top chassis 400 and the bottom chassis 260 may be coupled to each other to face each other. The top chassis 400 may cover the edge of the display panel 100.

Figure 2:
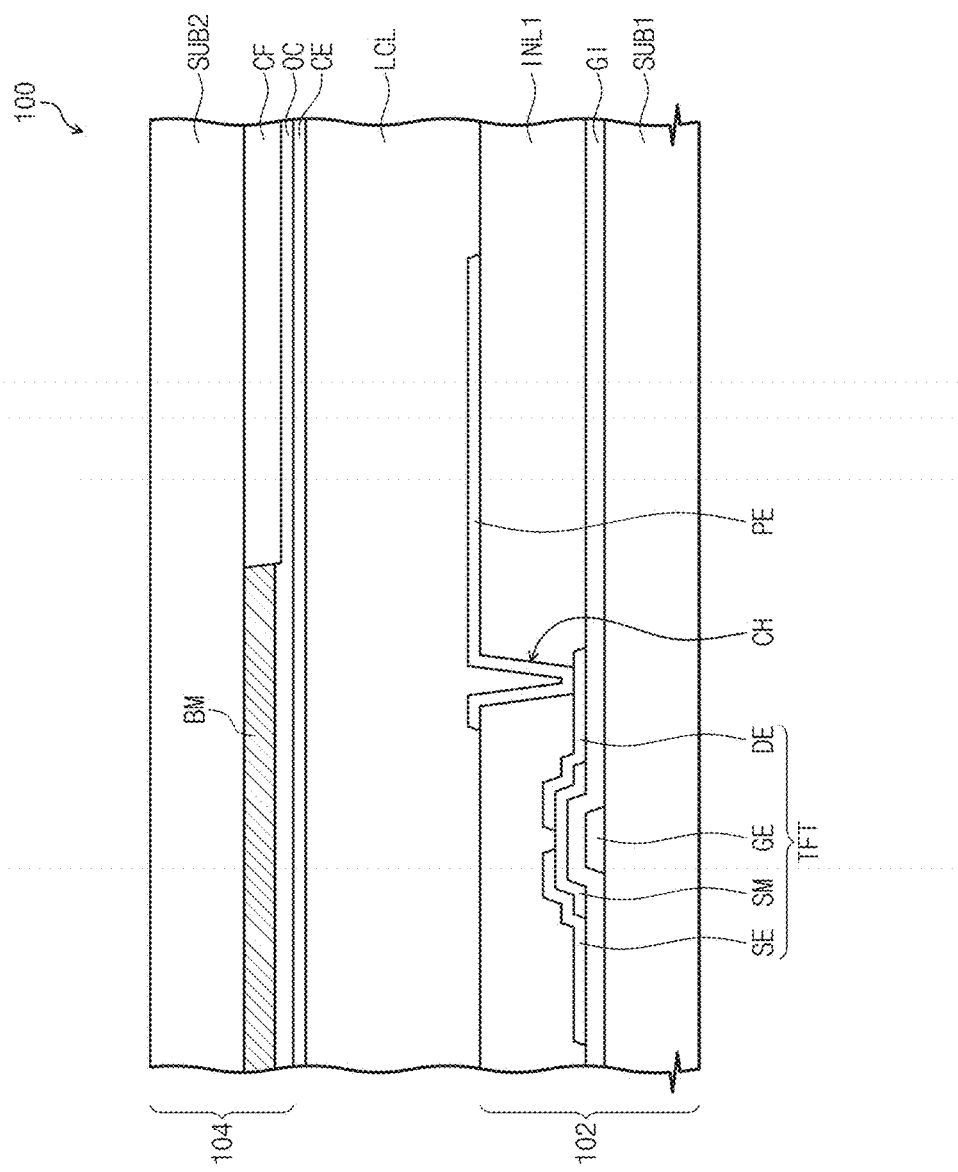
FIG. 2 is a schematic cross-sectional view of a display panel provided in the display device according to an embodiment of the inventive concept.

FIG. 2 is a schematic cross-sectional view of the display panel 100 provided in the display device 10 according to an embodiment of the inventive concept.

In reference to FIG. 2, the display panel 100 includes the first substrate 102, the second substrate 104, and a liquid crystal layer LCL.

The first substrate 102 includes a first base substrate SUB1, a thin film transistor TFT, and a pixel electrode PE.

The first base substrate SUB1 may be a transparent insulation substrate. The first base substrate SUB1 may be formed of silicon, glass, or plastic.

The gate line (not shown) and the data line (not shown) may be disposed on the first base substrate SUB1. The gate line (not shown) may be provided in plurality. Also, the gate line may be disposed on the first base substrate SUB1 to extend in the first direction (DR1). The data line (not shown) may be provided in plurality. Also, the data line may be disposed with the gate line (not shown) and a gate insulation layer GI therebetween to extend in the second direction (DR2) crossing the first direction (DR1).

The thin film transistor TFT may include a gate electrode GE, a semiconductor pattern SM, a source electrode SE, and a drain electrode DE.

The gate electrode GE is disposed on the first base substrate SUB1. The gate electrode GE may be branched from the gate line (not shown).

The gate electrode GE may be formed of a metal. The gate electrode GE may be formed of one of nickel, chrome, molybdenum, aluminum, titanium, copper, tungsten, and alloys thereof. The gate electrode GE may have a single-layered structure or a multi-layered structure using the metal. For example, the gate electrode GE may have a triple-layered structure in which molybdenum, aluminum, and molybdenum are sequentially stacked with each other or a double-layered structure in which titanium and copper are sequentially stacked with each other. Alternatively, the gate electrode GE may have a single-layered structure formed of an alloy of titanium and copper.

The gate insulation layer GI may be disposed on the gate electrode GE. The gate insulation layer GI covers the gate electrode GE. The gate insulation layer GI may be formed of an organic insulation material or inorganic insulation material.

The semiconductor pattern SM is disposed on the gate insulation layer GI. The semiconductor pattern SM and the gate electrode GE face each other with the gate insulation layer GI therebetween. A portion of the semiconductor pattern SM overlaps the gate electrode GE.

The source electrode SE may be branched from the data line (not shown). At least a portion of the source electrode SE may be disposed on the semiconductor pattern SM. At least a portion of the source electrode SE may overlap each of the semiconductor pattern SM and the gate electrode GE.

The drain electrode DE and the source electrode SE are spaced apart from each other with the semiconductor pattern SM therebetween. At least a portion of the drain electrode DE may be disposed on the semiconductor pattern SM. At least a portion of the drain electrode DE may overlap each of the semiconductor pattern SM and the gate electrode GE.

Each of the source electrode SE and the drain electrode DE may be formed of one of nickel, chrome, molybdenum, aluminum, titanium, copper, tungsten, and alloys thereof. Each of the source electrode SE and the drain electrode DE may have a single-layered structure or a multi-layered structure using the metal. For example, each of the source electrode SE and the drain electrode DE may have a double-layered structure in which titanium and copper are sequentially stacked with each other. Alternatively, each of the source electrode SE and the drain electrode DE may have a single-layered structure formed of an alloy of titanium and copper.

The first substrate 102 may further include a first insulation layer INL1 on the semiconductor pattern SM, the source electrode SE, and the drain electrode DE. For example, the first insulation layer INL1 may be formed of an insulation material such as silicon oxide or silicon nitride.

The first insulation layer INL1 includes a contact hole CH. At least a portion of the drain electrode DE may be exposed through the contact hole CH.

The pixel electrode PE is disposed on the first insulation layer INL1. The pixel electrode PE and the drain electrode DE may be connected to each other through the contact hole CH with the first insulation layer INL1 therebetween.

The pixel electrode PE may be formed of a transparent conductive material. The pixel electrode PE is formed of transparent conductive oxide. The transparent conductive oxide may include indium tin oxide (ITO), indium zinc oxide (IZO), and indium tin zinc oxide (ITZO). The pixel electrode PE may be formed by using various methods. For example, a photolithography process may be performed to form the pixel electrode PE.

The second substrate 104 may include a second base substrate SUB2, a color filter CF, a black matrix BM, and a common electrode CE. However, the present disclosure is not limited thereto. For example, the first substrate 102 may include the color filter CF, the black matrix BM, and the common electrode CE.

The second base substrate SUB2 may be a transparent insulation substrate. The second base substrate SUB2 may be formed of silicon, glass, or plastic.

The color filter CF is disposed on the second base substrate SUB2 to provide a color to the light emitted from the backlight unit 200. The color filter CF may include a red color filter, a green color filter, and a blue color filter. The color filter CF may further include a white color filter.

A color layer having a red, green, blue, or other color may be formed on the second base substrate SUB2 and then be patterned by using a photolithograph process to form the color filter CF. However, the formation method of the color filter CF is not limited thereto. For example, the color filter CF may be formed by using an inject method.

The black matrix BM is disposed on the second base substrate SUB2. The black matrix BM may overlap a light shielding area of the first substrate 102. The light shielding area may be defined as an area on which the data line (not shown), the gate line (not shown), and the thin film transistor TFT may be disposed. Since the pixel electrode PE is not generally disposed on the light shielding area, liquid crystal molecules may not be oriented to cause light leakage. The black matrix BM may be disposed on the light shielding area to prevent the light leakage from occurring. A light shielding layer absorbing light may be formed and then be patterned by using a photolithograph process to form the black matrix BM. Alternatively, the black matrix BM may be formed by using other methods, for example, the inkjet method.

A planarization layer OC may be disposed on the color filter CF and the black matrix BM. The planarization layer OC may planarize a top surface of the second base substrate SUB2 on which the black matrix BM is disposed. The planarization layer OC may include, for example, an organic insulation layer or inorganic insulation layer.

The common electrode CE may be disposed on the planarization layer OC. The common electrode CE may receive a common voltage. The common electrode CE may face the pixel electrode PE. Also, the common electrode CE together with the pixel electrode PE may generate electrical fields to drive a liquid crystal layer LCL.

The common electrode CE may be formed of a transparent conductive material. For example, the common electrode CE may be formed of conductive metal oxide such as indium tin oxide (ITO), indium zinc oxide (IZO), or indium tin zinc oxide (ITZO). The common electrode CE may be formed by using various methods. For example, a photolithography process may be performed to form the pixel electrode PE.

The liquid crystal layer LCL may include a plurality of liquid crystal molecules having dielectric anisotropy. When the electrical fields are applied between the pixel electrode PE and the common electrode CE, the liquid crystal molecules of the liquid crystal layer LCL rotates in a specific direction between the first and second substrates 102 and 104. Thus, light incident into the liquid crystal layer LCL may be adjusted in light transmission.

Figure 3A:
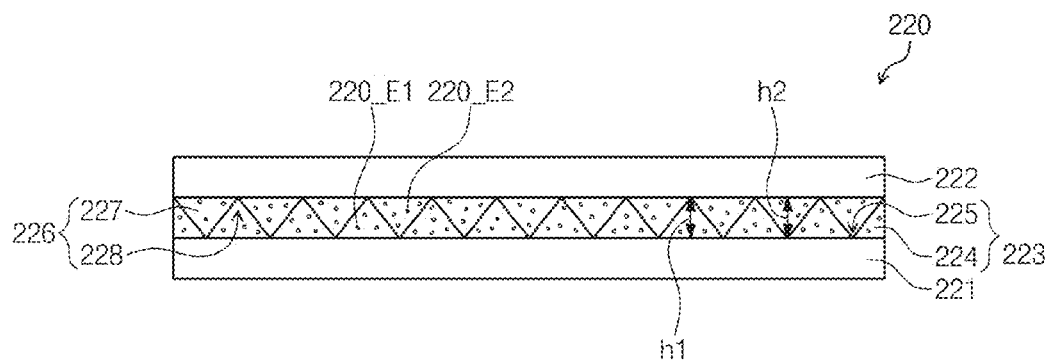
FIGS. 3A to 3C are schematic cross-sectional views of a light emitting sheet provided in the display device according to an embodiment of the inventive concept.
Figure 3B:
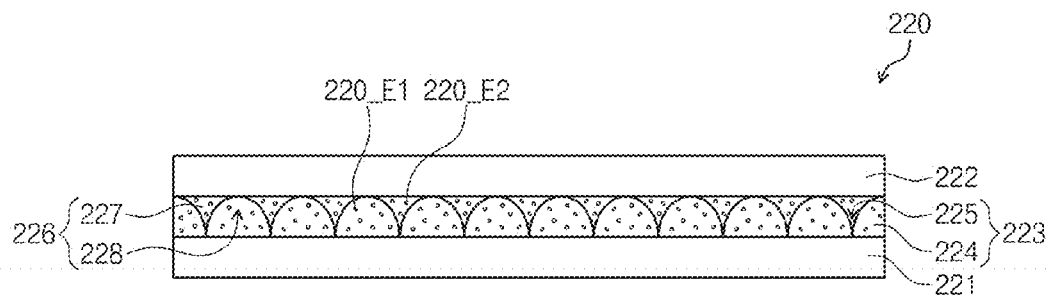
Figure 3C:
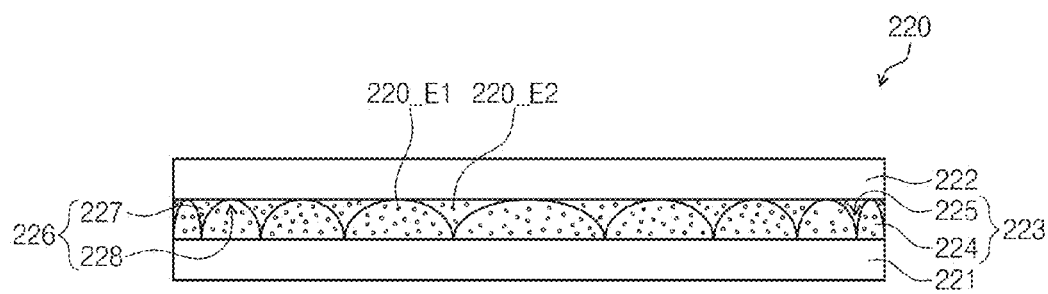

FIGS. 3A to 3C are schematic cross-sectional views of the light emitting sheet 220 provided in the display device 10 according to an embodiment of the inventive concept.

In reference to FIGS. 3A to 3C, the light emitting sheet 220 includes a lower film 221, a first light emitting resin pattern layer 223, an upper film 222 disposed on the first light emitting resin pattern layer 223, and a second light emitting resin pattern layer 226 disposed between the first light emitting resin pattern layer 223 and the upper film 222.

Each of the lower film 221 and the upper film 222 may be a barrier film. Each the lower and upper films 221 and 222 are specifically limited if they are commonly used. For example, each of the lower and upper films 221 and 222 may include at least one of polycarbonate (PC), polyethyleneterepthalate (PET), polyethylene (PE), polypropylene (PP), polysulphone (PSF), methylmethacrylate (PMMA), triacetyl cellulose (TAC), cyclo-olefin polymer (COP), and cyclo-olefin copolymer (COC).

The first light emitting resin pattern layer 223 includes a plurality of protrusions 224 disposed on the lower film 221 and a plurality of first grooves 225 defined between the plurality of first protrusions 224. The second light emitting resin pattern layer 226 disposed on one surface of the upper film 222 includes a plurality of second protrusions 227 and a plurality of second grooves 228 defined between the plurality of second protrusions 227. The second protrusions 227 contact the first grooves 225, respectively. Also, the first protrusions 224 contact the second grooves 228, respectively.

Figure 8A:
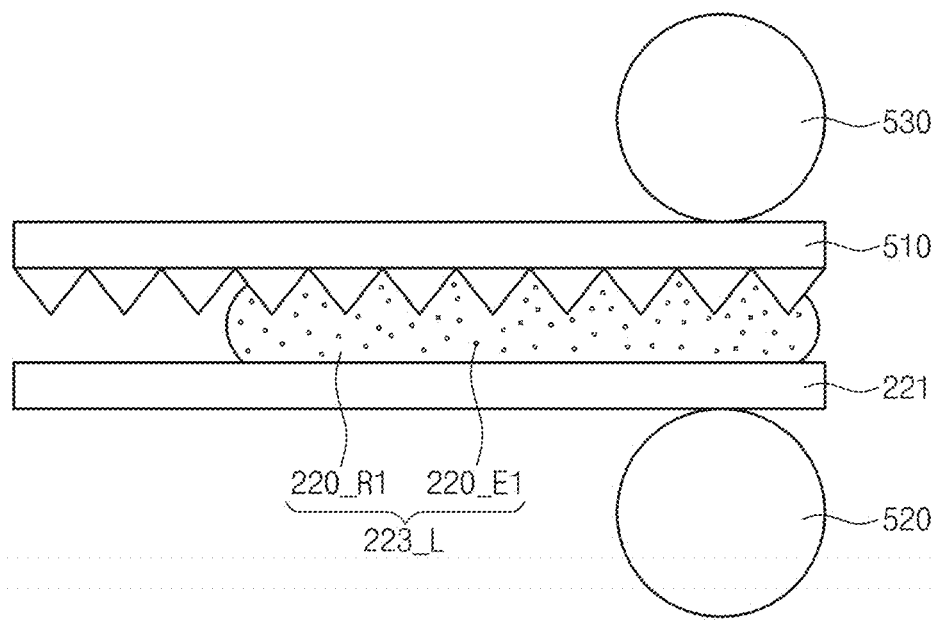
FIG. 8A to 8D are schematic flowcharts illustrating a method of fabricating the light emitting sheet in the method of fabricating the display device according to an embodiment of the inventive concept.

The first light emitting resin pattern layer 223 may have a thickness h1 of about 20 μm to about 40 μm. The thickness h1 of the first light emitting resin pattern layer 223 may represent, for example, a thickness that is perpendicular to one protrusion of the first protrusions 224 with respect to a bottom surface of the first light emitting resin pattern layer 223. When the first light emitting resin pattern layer 223 has a thickness h1 less than about 20 μm, the number of first light emitting particles 220_E1 contained in the first light emitting resin pattern layer 223 is less due to the small thickness thereof to deteriorate color reproducibility. When the first light emitting resin pattern layer 223 has a thickness h1 greater than about 40 μm, it may be difficult to control an amount of first light emitting resin solution (see reference numeral 223_L of FIG. 8A) to be injected for forming the first light emitting resin pattern layer 223 during the process.

A thickness h2 of the second light emitting resin pattern layer 226 may represent, for example, a thickness that is perpendicular to one protrusion of the second protrusions 227 with respect to a bottom surface of the second light emitting resin pattern layer 226. The second light emitting resin pattern layer 226 may have a thickness equal to or greater than that h1 of the first light emitting resin pattern layer 223. When the second light emitting resin pattern layer 226 has a thickness h2 less than that h1 of the first light emitting resin pattern layer 223, an empty space may be formed between the lower film 221 and the upper film 222. Thus, when the user sees the display device 10, visibility may be deteriorated. Although not shown, a thickness relief layer may be disposed between the first light emitting resin pattern layer 223 and the second light emitting resin pattern layer 226. The thickness relief layer may adjust the total thickness so that the total thickness of the first and second light emitting resin pattern layers 223 and 226 is uniform.

Each of the first protrusions 224 may have various shapes, for example, at least one of a triangular shape, a quadrangular shape, a partial circular shape, and a partial oval shape.

In reference to FIG. 3A, each of the first protrusions 224 may have a triangular shape. The first grooves 225 are defined between the first protrusions 224. Each of the first grooves 225 may have a triangular shape. Each of the second protrusions 227 may have the same shape as each of the first grooves 225 to contact each of the first grooves 225. Although the first protrusions 224 have the same size and shape in FIG. 3A, the present disclosure is not limited thereto. For example, the first protrusions 224 may have sizes and shapes different from each other.

In reference to FIG. 3B, each of the first protrusions 224 may have a partial circular shape. Each of the first protrusions 224 may have a lens shape. The first protrusion 224 may have an approximately semicircular shape. The first grooves 225 are defined between the first protrusions 224. Each of the first grooves 225 may have a shape in which two fan shapes are omitted in a quadrangular shape. Each of the second protrusions 227 may have the same shape as each of the first grooves 225 to contact each of the first grooves 225. Although the first protrusions 224 have the same size and shape in FIG. 3B, the present disclosure is not limited thereto. For example, the first protrusions 224 may have sizes and shapes different from each other.

In reference to FIG. 3C, each of the first protrusions 224 may have a partial oval shape. Each of the first protrusions 224 may have a lenticular shape. For example, the first protrusions 224 may have sizes that gradually decrease from a center of the light emitting sheet 220 toward one side of the light emitting sheet 220. The first grooves 225 are defined between the first protrusions 224. Each of the first grooves 225 may have a shape in which two ½ oval shapes having sizes different from each other are omitted in a quadrangular shape. Each of the second protrusions 227 may have the same shape as each of the first grooves 225 to contact each of the first grooves 225.

The first light emitting resin pattern layer 223 includes a first resin layer and a first light emitting particle 220_E1. The second light emitting resin pattern layer 226 includes a second resin layer and a second light emitting particle 220_E2. Although each of the first and second resin layers are not specifically limited in material, each of the first and second resin layers may be formed of, for example, a urethane-based resin, an acrylic-based resin, or a silicon-based resin.

The first light emitting particle 220_E1 may be contained in the first resin layer. The second light emitting particle 220_E2 may be contained in the second resin layer. Each of the first and second light emitting particles 220_E1 and 220_E2 may be a phosphor or quantum dot (see reference numeral 220_Q of FIG. 4). The first and second light emitting particles 220_E1 and 220_E2 may have the same size, and thus each of the first and second light emitting particles 220_E1 and 220_E2 may form a light emitting sheet having a uniform thickness, but is not limited thereto. The first and second light emitting particles 220_E1 and 220_E2 may have sizes different from each other, and also each of the first and second light emitting particles 220_E1 and 220_E2 may form a light emitting sheet having a uniform thickness. In this case, light having various wavelength bands may be emitted to improve image quality of the display device 10.

The phosphor may receive light from the light guide plate (see reference numeral 230 of FIG. 1) to emit white light. However, the present disclosure is not limited thereto. For example, the phosphor may receive light from the light guide plate (see reference numeral 230 of FIG. 1) to emit at least one of blue light, green light, and red light.

Figure 4:
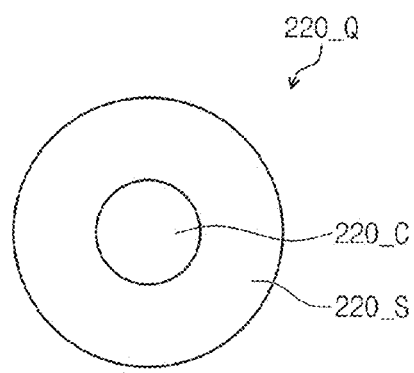
FIG. 4 is a schematic cross-sectional view of a quantum dot contained in the display device according to an embodiment of the inventive concept.

FIG. 4 is a schematic cross-sectional view of the quantum dot 220_Q contained in the display device 10 according to an embodiment of the inventive concept.

In reference to FIG. 4, the quantum dot 220_Q may receive light from the light guide plate (see reference numeral 230 of FIG. 1) to emit white light. However, the present disclosure is not limited thereto. For example, the quantum dot 220_Q may receive light from the light guide plate (see reference numeral 230 of FIG. 1) to emit at least one of blue light, green light, and red light. The light emitted from the quantum dot 220_Q may have a full width at half maximum (FWHM) less than that of an existing color filter or phosphor to realize superior color reproducibility.

The quantum dot 220_Q may be a material having a several nano-sized crystal structure and include several hundreds of atoms to several thousands of atoms. The quantum dot 220_Q may have a very small size to cause a quantum confinement effect. The quantum confinement effect may represent a phenomenon in which an object increases in band gap when the object has a size less than a nano size. Thus, when light having a wavelength with energy greater than that of a band gap is incident into the quantum dot 220_Q, the quantum dot 220_Q may absorb the light and thus be in an excited state to emit light having a specific wavelength, thereby becoming to a ground state. The emitted light has a value corresponding to the band gap. When the quantum dot 220_Q is adjusted in size and composition, a light emitting characteristic due to the quantum confinement effect may be adjusted.

Although the quantum dot 220_Q is not specifically limited in material, the quantum dot 220_Q may be formed of, for example, at least one of Group II-VI compounds, Group II-V compounds, Group III-VI compounds, Group III-V compounds, Group IV-VI compounds, Group I-III-VI compounds, Group II-IV-VI compounds, and Group II-IV-V compounds.

The quantum dot 220_Q may include a core 220_C and a shell 220_S overcoating the core 220_C. However, the core 220_C is not limited in material. For example, the core 220_C may be formed of at least one of CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, Fe2O3, Fe3O4, Si, and Ge. Although the shell 220_S is not limited in material, the shell 200_S may be formed of at least one of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, and PbTe.

Figure 5:
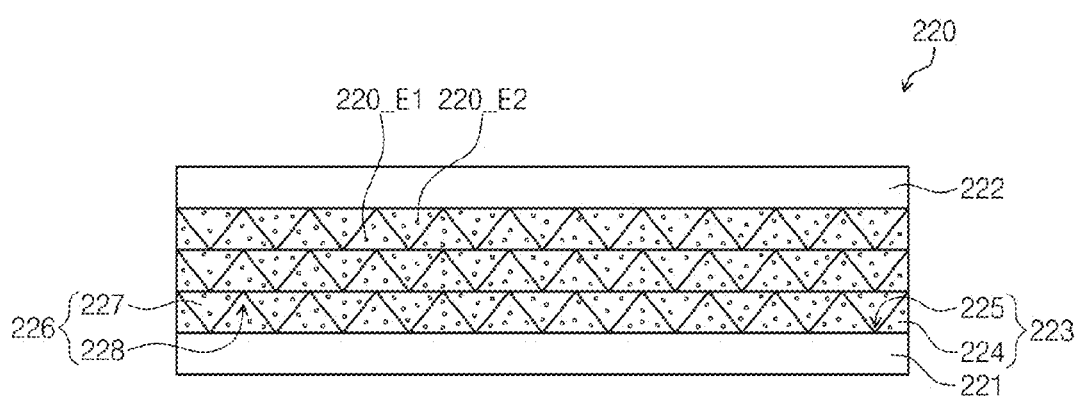
FIG. 5 is a schematic cross-sectional view of the light emitting sheet provided in the display device according to an embodiment of the inventive concept.

FIG. 5 is a schematic cross-sectional view of the light emitting sheet 220 provided in the display device 10 according to an embodiment of the inventive concept.

In reference to FIG. 5, at least one of the first light emitting resin pattern layer 223 and the second light emitting resin pattern layer 226 may be provided in plurality. The first light emitting resin pattern layer 223 and the second light emitting resin pattern layer 226 may be alternately disposed. Although three first light emitting resin pattern layers 223 and three second light emitting resin pattern layers 226 are provided in FIG. 5, the present disclosure is not limited thereto. For example, two first light emitting resin pattern layers 223 and two second light emitting resin pattern layers 226 may be alternately provided. Alternatively, at least four first light emitting resin pattern layers 223 and at least four second light emitting resin pattern layers 226 may be alternately provided.

In general, when the light emitting sheet is formed by using a light emitting resin solution having low viscosity of about 1,000 cP or less, the light emitting particles may not be aggregated, but be uniformly dispersed into the light emitting sheet. However, it is difficult to control a thickness of the light emitting sheet because the light emitting resin solution having the low viscosity during the process. Also, when the light emitting sheet is formed by using the light emitting resin solution having the low viscosity, the light emitting sheet may have a sufficient thickness that is capable of improving color reproducibility. However, it may be difficult to manufacture a light emitting sheet having a uniform thickness.

In reference to FIGS. 1 to 5, the display device 10 according to an embodiment of the inventive concept includes the first and second light emitting resin pattern layer 223 and 226, which are formed by using the light emitting resin solution having the low viscosity, to manufacture the light emitting sheet 220 having a sufficient thickness that is capable of improving the color reproducibility and also a uniform thickness. Therefore, the display device 10 according to an embodiment of the invention concept may have superior color reproducibility.

Hereinafter, a method of fabricating the display device 10 according to an embodiment of the inventive concept will be described. Hereinafter, different points with respect to the display device 10 according to the foregoing embodiment of the inventive concept will be mainly described, and thus, non-described portions will be quoted from the display device 10 according to the foregoing embodiment of the inventive concept.

Figure 6:
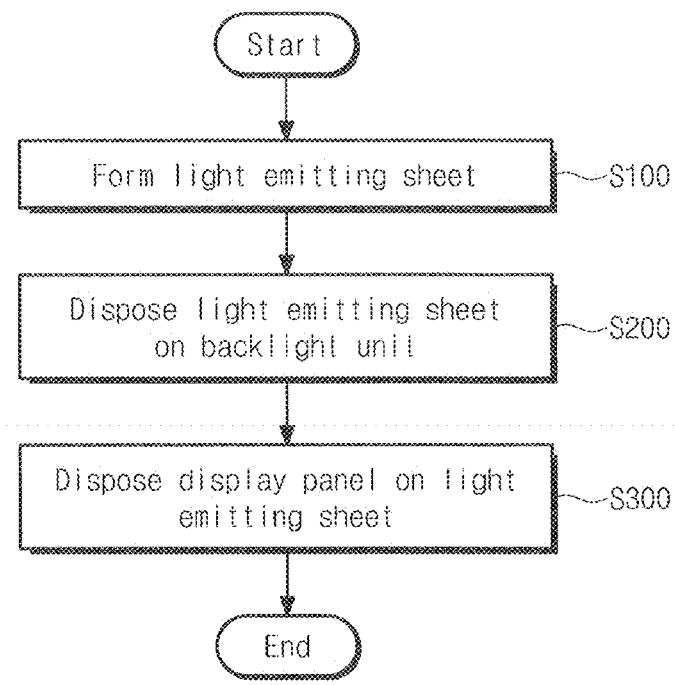
FIG. 6 is a schematic flowchart illustrating a method of fabricating the display device according to an embodiment of the inventive concept.

FIG. 6 is a schematic flowchart illustrating a method of fabricating the display device 10 according to an embodiment of the inventive concept.

In reference to FIGS. 1 to 6, a method of fabricating the display device 10 according to an embodiment of the inventive concept includes a process S100 of forming a light emitting sheet 220, a process S200 of disposing the light emitting sheet 220 on a backlight unit 200, and a process S300 of disposing a display panel 100 on the light emitting sheet 220.

Figure 7:
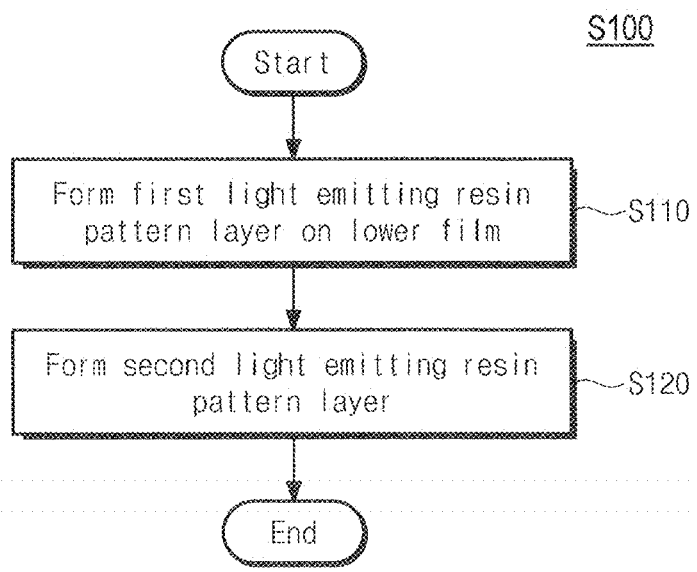
FIG. 7 is a schematic flowchart illustrating a method of fabricating the light emitting sheet in the method of fabricating the display device according to an embodiment of the inventive concept.

FIG. 7 is a schematic flowchart illustrating a method of fabricating the light emitting sheet 220 in the method of fabricating the display device 10 according to an embodiment of the inventive concept.

In reference to FIGS. 1, 3A, 6, and 7, the process S100 of forming the light emitting sheet 220 may include a process S110 of a first light emitting resin pattern layer 223 including a plurality of first protrusions 224 on a lower film 221 and a plurality of first grooves 225 formed between the first protrusions 224 and a process S120 of forming a second light emitting resin pattern layer 226 including a plurality of second protrusions 227 contacting the first grooves 225 and a plurality of second grooves 228 formed between the second protrusions 227 to contact the first protrusions 224. Although the light emitting sheet 220 having the cross-section of FIG. 3A is described as an example in the method of fabricating the display device 10 according to an embodiment of the inventive concept, the present disclosure is not limited thereto. For example, the display device 10 including the light emitting sheet 220 having various shapes such as the light emitting sheet 220 having the cross-section of FIG. 3B or the light emitting sheet 220 having the cross-section of FIG. 3C may be fabricated.

The process S110 of forming the first light emitting resin pattern layer 223 may include a process of providing a first light emitting resin solution (see reference numeral 223_L of FIG. 8A) onto the lower film 221, a process of forming a first light emitting resin pattern on the lower film 221, and a process of curing the first light emitting resin pattern to form the first light emitting resin pattern layer 223.

The process S110 of forming the first light emitting resin pattern may include a process of disposing a patterning mold (see reference numeral 510 of FIG. 8A) on the lower film 221 and a process of rolling the patterning mold (see reference numeral 510 of FIG. 8A) to form the first light emitting resin pattern.

FIG. 8A to 8D are schematic flowcharts illustrating a method of fabricating the light emitting sheet 220 in the method of fabricating the display device 10 according to an embodiment of the inventive concept.

In reference to FIGS. 1, 4, 7, and 8A, a light emitting resin solution 223_L is provided onto a lower film 221. The first light emitting resin solution 223_L includes a first resin solution 233_R and a first light emitting particle 220_E1.

The first resin solution 233_R may include a urethane-based resin, an acrylic-based resin, or a silicon-based resin. The first light emitting particle 220_E1 may be a phosphor or quantum dot 220_Q.

Although the quantum dot 220_Q is not specifically limited in material, the quantum dot 220_Q may be formed of, for example, at least one of Group II-VI compounds, Group II-V compounds, Group III-VI compounds, Group III-V compounds, Group IV-VI compounds, Group I-III-VI compounds, Group II-IV-VI compounds, and Group II-IV-V compounds.

The quantum dot 220_Q may include a core 220_C and a shell 220_S overcoating the core 220_C. However, the core 220_C is not limited in material. For example, the core 220_C may be formed of at least one of CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, Fe2O3, Fe3O4, Si, and Ge. Although the shell 220_S is not limited in material, the shell 200_S may be formed of at least one of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TIN, TIP, TlAs, TlSb, PbS, PbSe, and PbTe.

The first light emitting resin solution 223_L may have viscosity of about 1 cP to 1,000 cP. When the first light emitting resin solution 223_L has viscosity less than about 1 cP, it may be difficult to control the first light emitting resin solution 223_L during the process. On the other hand, when the first light emitting resin solution 223_L has viscosity greater than 1,000 cP, the first light emitting particles 220_E1 may not be uniformly dispersed into the first light emitting resin solution 223_L.

A patterning mold 510 is disposed on the lower film 221 onto which the first light emitting resin solution 223_L is provided. A lower roller 520 is disposed under the lower film 221. An upper roller 530 is disposed on the patterning mold 510. The lower film 221 and the patterning mold 510 are rolled by using the lower roller 520 and the upper roller 530 to form a first light emitting resin pattern on the lower film 221. Although not shown, the first light emitting resin pattern may have the same shape as the first light emitting resin pattern layer (see reference numeral 223 of FIG. 8B).

Figure 8B:
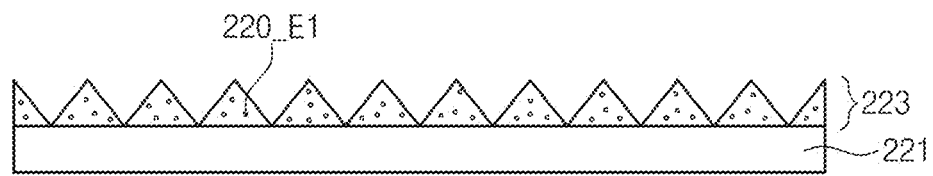

In reference to FIGS. 1, 7, and 8B, the first light emitting resin pattern may be cured to form a first light emitting resin pattern layer 223. The curing method of the first light emitting resin pattern is not specifically limited. However, the first light emitting resin pattern may be cured by using heat, UV, IR, and the like.

The first light emitting resin pattern layer 223 may have a thickness (see reference symbol h1 of FIG. 3A) of about 20 μm to about 40 μm. When the first light emitting resin pattern layer 223 has a thickness h1 (see reference symbol h1 of FIG. 3A) less than about 20 μm, the number of first light emitting particles 220_E1 contained in the first light emitting resin pattern layer 223 is less due to the small thickness thereof to deteriorate color reproducibility. When the first light emitting resin pattern layer 223 has a thickness h1 (see reference symbol h1 of FIG. 3A) greater than about 40 μm, it may be difficult to control an amount of first light emitting resin solution (see reference numeral 223_L of FIG. 8A) to be injected for forming the first light emitting resin pattern layer 223 during the process.

Figure 8C:
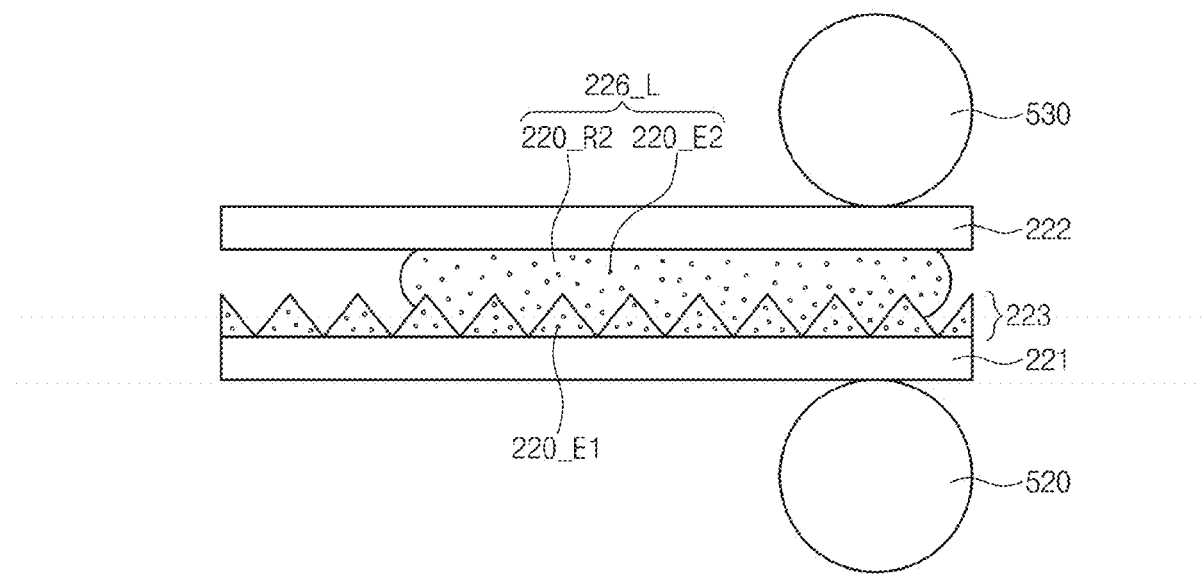

In reference to FIGS. 1, 7, and 8C, a process S120 of forming a second light emitting resin pattern layer 226 may include a process of disposing an upper film 222 on a lower film 221 on which the first light emitting resin pattern layer 223 is formed, a process of providing a second light emitting resin solution 226_L between the first light emitting resin pattern layer 223 and the upper film 222, a process of forming a second light emitting resin pattern between the first light emitting resin pattern layer 223 and the upper film 222, and a process of curing the second light emitting resin pattern to form the second light emitting resin pattern layer 226.

The process S120 of forming the second light emitting resin pattern may include a process of rolling the lower film 221 and the upper film 222 to form the second light emitting resin pattern.

In reference to FIGS. 1, 4, 7, and 8C, a second light emitting resin solution 226_L is provided between the first light emitting resin pattern layer 223 and the upper film 222. The second light emitting resin solution 226_L includes a second resin solution 236_R and a second light emitting particle 220_E2. The second resin solution 236_R may include a urethane-based resin, an acrylic-based resin, or a silicon-based resin. The second light emitting particle 220_E2 may be a phosphor or quantum dot 220_Q.

Although the quantum dot 220_Q is not specifically limited in material, the quantum dot 220_Q may be formed of, for example, at least one of Group II-VI compounds, Group II-V compounds, Group III-VI compounds, Group III-V compounds, Group IV-VI compounds, Group I-III-VI compounds, Group II-IV-VI compounds, and Group II-IV-V compounds.

The quantum dot 220_Q may include a core 220_C and a shell 220_S overcoating the core 220_C. However, the core 220_C is not limited in material. For example, the core 220_C may be formed of at least one of CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, Fe3O4, Fe3O4, Si, and Ge. Although the shell 220_S is not limited in material, the shell 200_S may be formed of at least one of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, and PbTe.

The second light emitting resin solution 226_L may have viscosity of about 1 cP to 1,000 cP. When the second light emitting resin solution 226_L has viscosity less than about 1 cP, it may be difficult to control the second light emitting resin solution 226_L during the process. On the other hand, when the second light emitting resin solution 226_L has viscosity greater than 1,000 cP, the second light emitting particles 220_E2 may not be uniformly dispersed into the second light emitting resin solution 226_L.

A lower roller 520 is disposed under the lower film 221 onto which the second light emitting resin solution 226_L is provided. An upper roller 530 is disposed on the upper film 222. The lower film 221 and the upper film 222 are rolled by using the lower roller 520 and the upper roller 530 to form a second light emitting resin pattern between the first light emitting resin pattern layer 223 and the upper film 222. Although not shown, the second light emitting resin pattern may have the same shape as the second light emitting resin pattern layer 226.

Figure 8D:
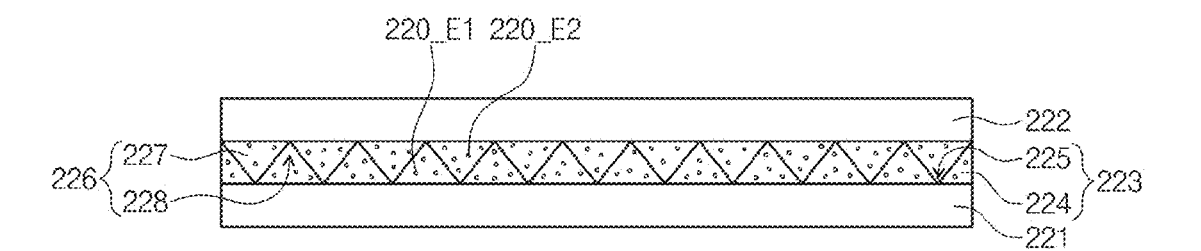

In reference to FIGS. 1, 7, and 8D, the second light emitting resin pattern may be cured to form a second light emitting resin pattern layer 226. The curing method of the second light emitting resin pattern is not specifically limited. However, the first light emitting resin pattern may be cured by using heat, UV, IR, and the like.

The second light emitting resin pattern layer 226 may have a thickness (see reference symbol h2 of FIG. 3A) greater than or equal to that (see reference symbol h1 of FIG. 3A) of the first light emitting resin pattern layer 223. When the second light emitting resin pattern layer 226 has a thickness (see reference symbol h2 of FIG. 3A) less than that (see reference symbol h1 of FIG. 3A) of the first light emitting resin pattern layer 223, an empty space may be formed between the lower film 221 and the upper film 222. Thus, when the user sees an image displayed on the display device 10, visibility may be deteriorated. The process S110 of forming the first light emitting resin pattern layer 223 and the process S120 of forming the second light emitting resin pattern layer 226 may be performed several times. When the process of S120 of forming the second light emitting resin pattern layer 226 is performed several times, a release film (not shown) may be formed on at least one surface of the upper film 222. Since the release film is provided, the second light emitting resin pattern layer 226 and the upper film 222 may be delaminated from each other. The first light emitting resin pattern layer 223 and the second light emitting resin pattern layer 226 may be further formed at least one time on the delaminated second light emitting resin pattern layer 226. Thus, the light emitting sheet 220 having the sufficient thickness that is capable of being used for the display device 10 may be fabricated according to user's requirement.

In general, if the light emitting sheet is formed by using a light emitting resin solution having viscosity of about 1,000 cP or less, light emitting particles may not be aggregated, but be uniformly dispersed into the light emitting sheet. However, it is difficult to control the light emitting resin solution having the low viscosity during the process. Also, when the light emitting sheet is formed by using the light emitting resin solution having the low viscosity, the light emitting sheet may have a sufficient thickness that is capable of improving color reproducibility. However, it may be difficult to manufacture a light emitting sheet having a uniform thickness.

In the method of fabricating the display device according to an embodiment of the inventive concept, the first light emitting resin pattern layer may be formed by using the light emitting resin solution having the low viscosity, and the first light emitting resin pattern layer. Then, the second light emitting resin pattern layer may be formed to easily control the light emitting resin solution having the low viscosity. Therefore, the light emitting sheet having the sufficient thickness that is capable of improving the color reproducibility and also having the uniform thickness may be fabricated. The display device fabricated by the method of fabricating the display device according to the embodiment of the invention concept may include the light emitting sheet that is formed by using the light emitting resin solution having the low viscosity and has the sufficient and uniform thickness to realize superior color reproducibility.

Hereinafter, the present disclosure will be described in detail with reference to an exemplary embodiment. The following embodiment is merely illustrative, and the present disclosure is not limited to the following embodiment.

Embodiment 1

A lower film and upper film formed of polyethylene terephthalate (PET) was prepared. A first light emitting resin solution was provided onto the lower film. A light emitting resin solution having viscosity of about 700 cP was prepared as the first light emitting resin solution. The first light emitting resin solution includes a urethane resin as a first resin solution and a quantum dot as a first light emitting particle. The quantum dot provided as the first light emitting particle has a core-shell structure. Here, the core is formed of Ca, and the shell is formed of ZnS.

A patterning mold was disposed on the lower film onto which the first light emitting resin solution is provided. A lower roller was disposed under the lower film. An upper roller was disposed on the patterning mold. The lower film and the pattern mold were rolled by using the lower roller and the upper roller to form a first light emitting resin pattern on the lower film. The first light emitting resin pattern was cured by using UV to form a first light emitting resin pattern layer having a shape illustrated in FIG. 3A and a thickness of about 30 μm.

The upper film was disposed on the first light emitting resin pattern layer, and a second light emitting resin solution was provided between the first light emitting resin pattern layer and the upper film. A light emitting resin solution having viscosity of about 700 cP was prepared as the second light emitting resin solution. The second light emitting resin solution includes a urethane resin as a second resin solution and a quantum dot as a second light emitting particle having the same size as the first light emitting particle. The quantum dot provided as the second light emitting particle has a core-shell structure. Here, the core is formed of Ca, and the shell is formed of ZnS.

A lower roller was disposed under the lower film onto which the second light emitting resin solution is provided. An upper roller was disposed on the upper film. The lower film and the upper film were rolled by using the lower roller and the upper roller to form a second light emitting resin pattern between the first light emitting resin pattern layer and the upper film. The second light emitting resin pattern was cured by using UV to form a second light emitting resin pattern layer having a shape illustrated in FIG. 3A and a thickness of about 30 μm.

The upper film was delaminated from the second light emitting resin pattern layer, and two first light emitting resin pattern layers and two second light emitting resin pattern layers were further alternately formed to fabricate a light emitting sheet.

The fabricated light emitting sheet was disposed on a backlight unit, and a display panel was disposed on the light emitting sheet to fabricate a display device.

Comparative Example 1

A light emitting sheet and display device, which are the same as those according to Embodiment 1, except for a single-layered light emitting resin layer that is formed between the lower film and the upper film in a lamination manner.

Experimental Result

Figure 9:
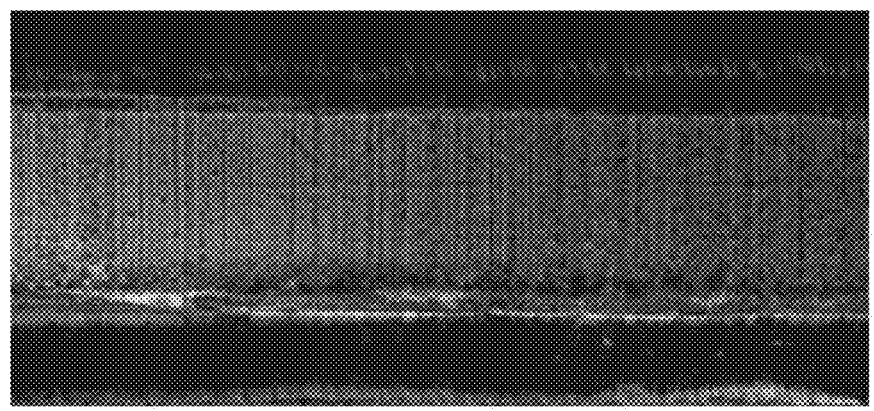
FIG. 9 is a photograph obtained by photographing a cross-section of a light emitting sheet that is fabricated in Embodiment 1 of the inventive concept.

FIG. 9 is a photograph obtained by photographing a cross-section of a light emitting sheet that is fabricated in Embodiment 1 of the inventive concept. In reference to FIG. 9, it is seen through a cross-section that three first light emitting resin pattern layers and three second light emitting resin pattern layers are alternately formed. In Embodiment 1, the sum of thicknesses of the first light emitting resin pattern layer and second light emitting resin pattern layer, i.e., a thickness between the lower film and the upper film was measured. Here, the thickness was about 90 μm to about 94 μm, and a tolerance was about 4 μm. In Comparative Example 1, the light emitting resin layer had a thickness of about 86 μm to about 100 μm, and a tolerance in the thickness was about 14 μm. It was seen that the light emitting sheet fabricated according to Embodiment 1 has a relatively uniform thickness when compared to that of the light emitting sheet fabricated according to Comparative Example 1.

In the display device according to the embodiment of the inventive concept, the display device including the light emitting sheet having a uniform thickness that is capable of realizing the superior color reproducibility by using the resin having low viscosity may be provided.

In the method of fabricating the display device according to the embodiment of the invention concept, the display device including the light emitting sheet having a uniform thickness that is capable of realizing the superior color reproducibility by using the resin having low viscosity may be fabricated.

Although the embodiments of the inventive concept are described with reference to the accompanying drawings, those with ordinary skill in the technical field of the inventive concept pertains will be understood that the present disclosure can be carried out in other specific forms without changing the technical idea or essential features. Thus, the above-disclosed embodiments are to be considered illustrative and not restrictive.

What is claimed is:

1. A method of fabricating a display device, the method comprising:
   forming a light emitting sheet;
   disposing the light emitting sheet on a backlight unit; and
   disposing a display panel on the light emitting sheet,
   wherein the formation of the light emitting sheet comprises:
      forming a first light emitting resin pattern comprising a plurality of first protrusions and a plurality of first grooves formed between the first protrusions on a first film; and
      forming a second light emitting resin pattern comprising a plurality of second protrusions contacting the first grooves and a plurality of second grooves formed between the second protrusions to contact the first protrusions, and
   wherein the first light emitting resin pattern comprises a first light emitting particle, the second light emitting resin pattern comprises a second light emitting particle, and each of the first and second light emitting particles comprises a phosphor or quantum dot.

2. The method of claim 1, wherein the formation of the first light emitting resin pattern comprises:
   coating a first light emitting resin solution onto the first film;
   forming a first light emitting resin pattern on the first film; and
   curing the first light emitting resin pattern.

3. The method of claim 2, wherein the formation of the first light emitting resin pattern comprises:
   disposing a patterning mold on the first film; and
   rolling the first film and the patterning mold to form the first light emitting resin pattern.

4. The method of claim 2, wherein the formation of the second light emitting resin pattern comprises:
   disposing a second film on the first film on which the first light emitting resin pattern is formed;
   providing a second light emitting resin solution between the first light emitting resin pattern and the second film;
   forming a second light emitting resin pattern between the first light emitting resin pattern and the second film; and
   curing the second light emitting resin pattern.

5. The method of claim 4, wherein the formation of the second light emitting resin pattern comprises rolling the first film and the second film to form the second light emitting resin pattern.

6. The method of claim 4, wherein each of the first light emitting resin solution and the second light emitting resin solution has viscosity of about 1 cP to about 1,000 cP.

7. The method of claim 1, wherein the first light emitting resin pattern has a thickness of about 20 μm to about 40 μm.

8. The method of claim 1, wherein the formation of the second light emitting resin pattern comprises forming the second light emitting resin pattern so that the second light emitting resin pattern has a thickness greater than or equal to that of the first light emitting resin pattern.

9. The method of claim 1, wherein each of the first protrusions has a shape selected from a triangular shape, a quadrangular shape, a partially circular shape, and a partially oval shape.

10. The method of claim 1, wherein the formation of the first light emitting resin pattern and the formation of the second light emitting resin pattern are performed multiple times.

* * * * *